(12) United States Patent
Church et al.

(10) Patent No.: US 9,611,880 B1
(45) Date of Patent: Apr. 4, 2017

(54) CONNECTOR USABLE WITH FLOATING DOCKS

(71) Applicants: Brian Church, Atlantic, IA (US); Jon Olson, Atlantic, IA (US)

(72) Inventors: Brian Church, Atlantic, IA (US); Jon Olson, Atlantic, IA (US)

(73) Assignee: Owner Revolution Inc., Adair, IA (US)

( * ) Notice: Subject to any disclaimer, the term of this patent is extended or adjusted under 35 U.S.C. 154(b) by 359 days.

(21) Appl. No.: 14/189,299

(22) Filed: Feb. 25, 2014

(51) Int. Cl.
*F16B 17/00* (2006.01)

(52) U.S. Cl.
CPC .................. *F16B 17/00* (2013.01)

(58) Field of Classification Search
None
See application file for complete search history.

(56) References Cited

U.S. PATENT DOCUMENTS

| | | | | | |
|---|---|---|---|---|---|
| 4,762,505 | A | * | 8/1988 | Asick | H01R 13/6275 439/347 |
| 5,421,127 | A | * | 6/1995 | Stefely | A62C 2/06 137/75 |
| 6,176,052 | B1 | * | 1/2001 | Takahashi | F16L 5/04 137/75 |
| 6,180,882 | B1 | * | 1/2001 | Dinh | H02G 3/22 16/2.2 |
| 8,579,647 | B2 | * | 11/2013 | Phillips | H01R 13/6461 439/345 |
| 9,046,194 | B2 | * | 6/2015 | Gandolfo | F16L 5/04 |
| 2008/0128998 | A1 | * | 6/2008 | Klein | F16L 5/04 277/604 |
| 2012/0012347 | A1 | * | 1/2012 | Zernach | A62C 2/065 169/48 |
| 2012/0087741 | A1 | * | 4/2012 | Desmeules | E02D 5/285 405/251 |
| 2013/0333322 | A1 | * | 12/2013 | Stein | E04B 1/18 52/741.1 |
| 2014/0047791 | A1 | * | 2/2014 | Carnes | E04C 3/04 52/653.2 |
| 2014/0079474 | A1 | * | 3/2014 | Andreini | F16B 5/0004 403/292 |
| 2015/0155652 | A1 | * | 6/2015 | Ender | H01R 13/6278 403/376 |

FOREIGN PATENT DOCUMENTS

CA    2876134 A1 * 8/2015

* cited by examiner

*Primary Examiner* — Elizabeth A Quast
(74) *Attorney, Agent, or Firm* — David M. Breiner; BrownWinick Law Firm

(57) ABSTRACT

Disclosed is a connector that may include a first member and a second member. The first member may have a first fastening member and a first cavity, the second member may have a second fastening member and a second cavity, and the second fastening member may be engaged with the first fastening member. The insert may further include an insert in the first and second cavities.

11 Claims, 9 Drawing Sheets

CONNECTOR USABLE WITH FLOATING DOCKS

BACKGROUND

1. Field

Example embodiments relate to a connector and a method for manufacturing the connector. In example embodiments, the connector may be used to connect a first structure to a second structure. In example embodiments, the first structure and the second structure may be, but are not required to be, sections of a floating dock.

2. Description of the Related Art

FIG. 1 is a view of a connector 10 used to connect sections of a floating dock. The connector 10 includes a body 12 with a pair of flanges 15. The pair of flanges 15 is configured to be received in and interlock with a receiving socket of a dock section. Each flange 15 has an inwardly tapered post section 20 adjacent to which is a top recess 22. The post sections 20 include threaded bores 25 to allow the post sections 20 to attach to a floating dock section via a threaded member. The body 12 further includes two side members 30 (only one of which is shown in FIG. 1) that are somewhat similar in shape to the flanges 15 and extend in opposite directions. Each of the side members 30 includes a recess 35. In the prior art, the recesses 22 and 30 may serve as receiving areas for portions of the sockets the connector 10 is configured to interlock with.

SUMMARY

Applicants have noted that while the prior art connectors satisfactorily perform for their intended purpose, the manufacture thereof can be complicated. Thus, Applicants set out to invent a new type of connector which would be easier to manufacture and produce. As a consequence, Applicants invented a novel and nonobvious process for manufacturing a connector which may be used to connect floating dock sections together. The connectors produced in the method are also new and nonobvious. While the invention was originally directed to a process making and using a connector usable in the floating dock industry, the applicants note the invention may be applied in a variety of fields. For example, the inventive process and connector may be applied across various industries including the automotive industry, the aerospace industry, and the construction industry. In other words, the invention may be applied in cases where it is desired to attach two structures together, whether or not the structures are associated with a floating dock.

Example embodiments relate to a connector and a method for manufacturing the connector. In example embodiments, the connector may be used to connect a first structure to a second structure. In example embodiments, the first structure and the second structure may be, but are not required to be, sections of a floating dock.

In accordance with example embodiments, a connector may include a first member having a first fastening member and a first cavity, a second member having a second fastening member and a second cavity, and an insert in the first and second cavities. In example embodiments, the first and second fastening members may be engaged with on another.

In accordance with example embodiments, a system may include a first structure having a receiving socket, a connector in the receiving socket, and a fastener fastening the connector to the first structure. In example embodiments, the connector may include a first member, a second member, and an insert. The first member may have a first fastening member and a first cavity and the second member may have a second fastening member and a second cavity. In example embodiments, the second fastening member may be engaged with the first fastening member and the insert may be in the first and second cavities.

BRIEF DESCRIPTION OF THE DRAWINGS

Example embodiments are described in detail below with reference to the attached drawing figures, wherein.

DETAILED DESCRIPTION

Figure 1:
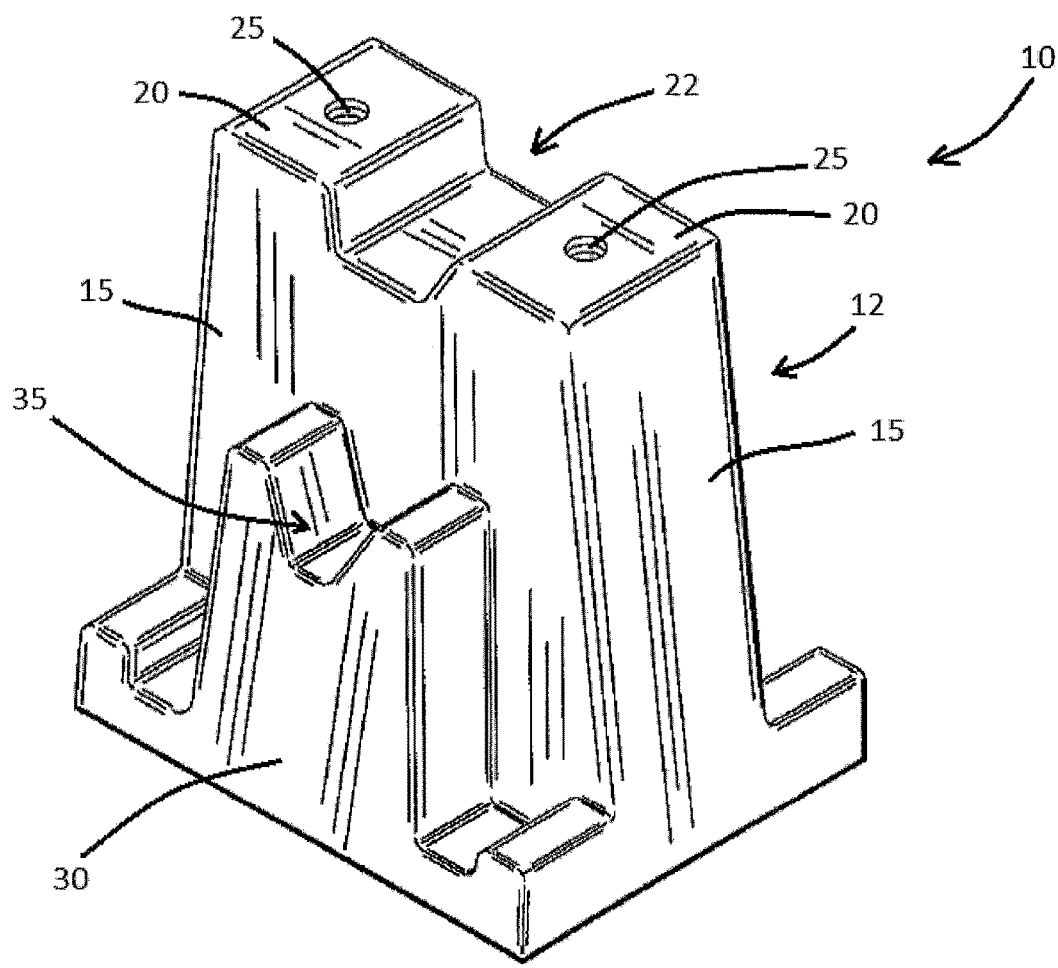
FIG. 1 is a view of a prior art connector.

Example embodiments will now be described more fully with reference to the accompanying drawings. Example embodiments are not intended to limit the invention since the invention may be embodied in different forms. Rather, example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a connector and a method of making the connector. In example embodiments, the connector may be used to connect a first structure to a second structure. In example embodiments the first and second structures may be, but are not required to be, sections of a floating dock.

Figure 2:
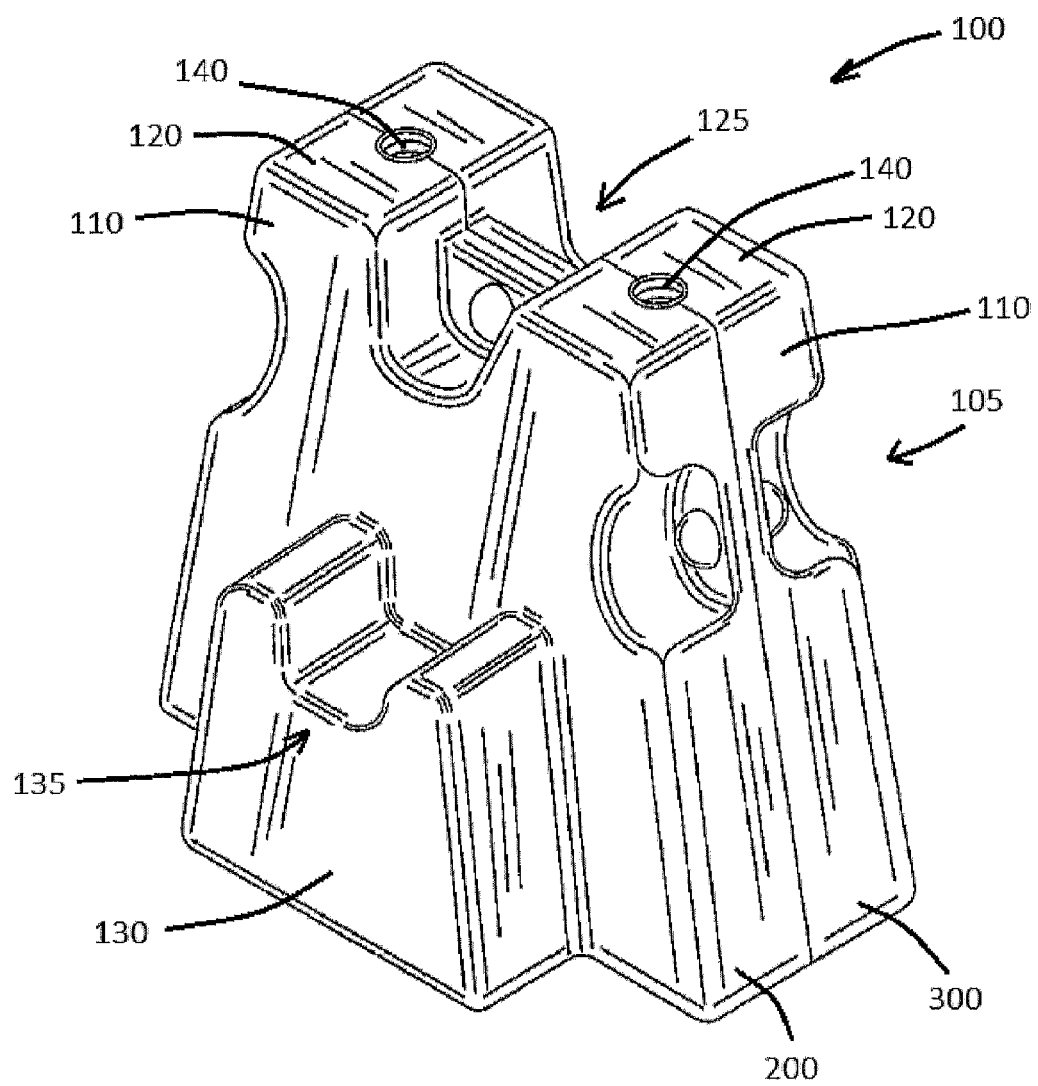
FIG. 2 is a view of a connector in accordance with example embodiments.

FIG. 2 illustrates an example of a connector 100 in accordance with example embodiments. As shown in FIG. 2, the connector 100 may include a body 105 with at least two flanges 110. In example embodiments, the at least two flanges 110 may be configured to interlock with sockets of a structure, for example, a section of a floating dock. Although only two flanges 110 are illustrated in FIG. 2, the connector 100 may be configured with more than two flanges 110. Also, the particular shape of the flanges 110 illustrated in example embodiments is not intended to limit the invention as the shape may vary in accordance with the socket the connector 100 is configured to interlock with.

In example embodiments, each flange 110 may have may have a post section 120 adjacent to which may be a top recess 125. In example embodiments, the post sections 120 may be, but are not required to be, inwardly tapering as shown in the figures. In example embodiments, apertures 140 may be may be present in the post sections 120 and the apertures 140 may include internally threaded members usable to connect the connector 100 to the aforementioned structures. In example embodiments, the connector 100 may further include a pair of side members 130 (only one of which is shown in FIG. 2) which may have a notch 135. The notch 135 may serve as a receiving area into which a portion of a socket may be inserted when the connector 100 interlocks with a structure.

In example embodiments, the connector 100 may be comprised of several components. For example, in FIG. 2, the example connector 100 may comprised of a first member 200 and a second member 300. In example embodiments, the first member 200 and the second member 300 may be, but are not required to be, substantially identical. In example embodiments, the first and second members 200 and 300 may be connected to each other by various means. For example, in example embodiments, ends of the first and second members 200 and 300 may include connecting members which may allow the first and second members 200 and 300 to connect together. The connecting members, for example, may resemble hook and catch type members (as will be explained shortly) or another type of connecting member such as, but not limited to, a snap.

Figure 3A:
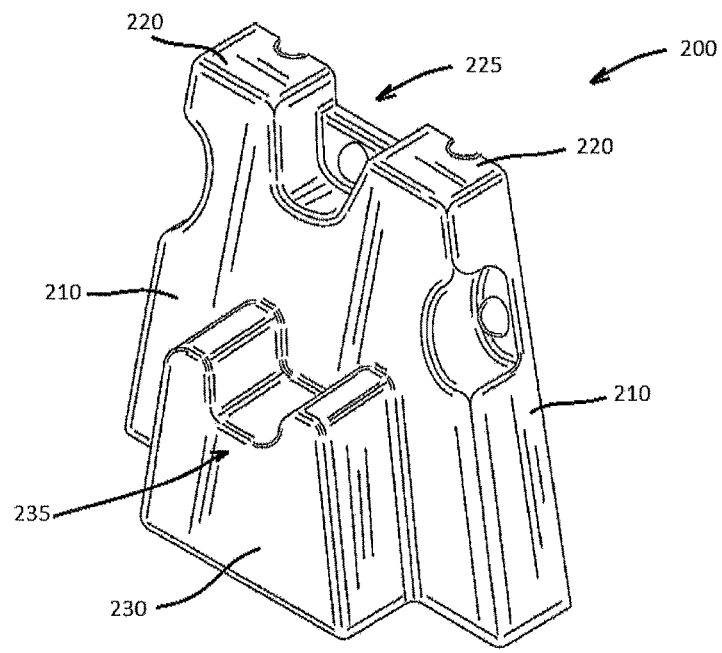
FIGS. 3A and 3B are views of a first member of the connector in accordance with example embodiments.
Figure 3B:
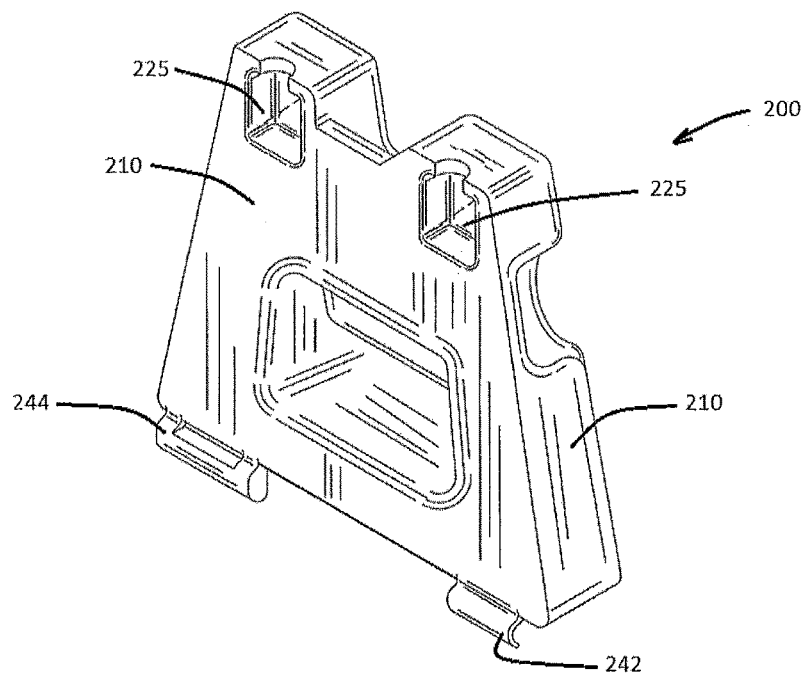

FIGS. 3A and 3B illustrate views of the first member 200 in accordance with example embodiments. As shown in FIGS. 3A and 3B, the first member 200 may include a pair of flanges 210. In example embodiments the pair of flanges 210 may make up half of the pair of flanges 110 illustrated in FIG. 2. The particular shape of the flanges 210 illustrated in example embodiments is not intended to limit the invention as the shape may vary in accordance with a socket the connector 100 is configured to interconnect with. In addition, while the first member 200 is illustrated as including two flanges 210, the first member 200 may alternatively include more than two flanges 210. In other words, the number of flanges illustrated in the figures is not meant to limit the invention.

In example embodiments, each flange 210 may have a post section 220 adjacent to which may be a top recess 225. In example embodiments, the post sections 220 may form half of the post sections 120 illustrated in FIG. 2. In example embodiments, the post sections 220 may be inwardly tapering as shown in the figures.

Figure 4:
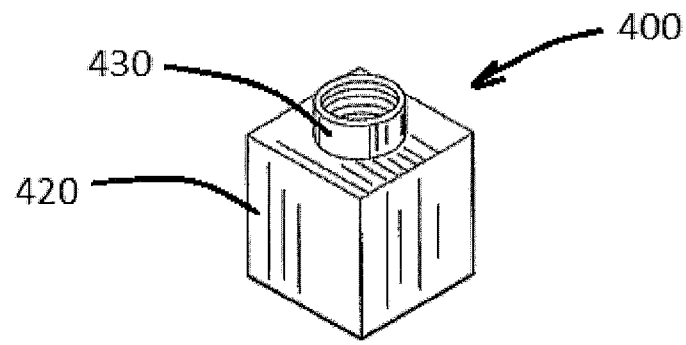
FIG. 4 is a view of an insert in accordance with example embodiments.
Figure 5:
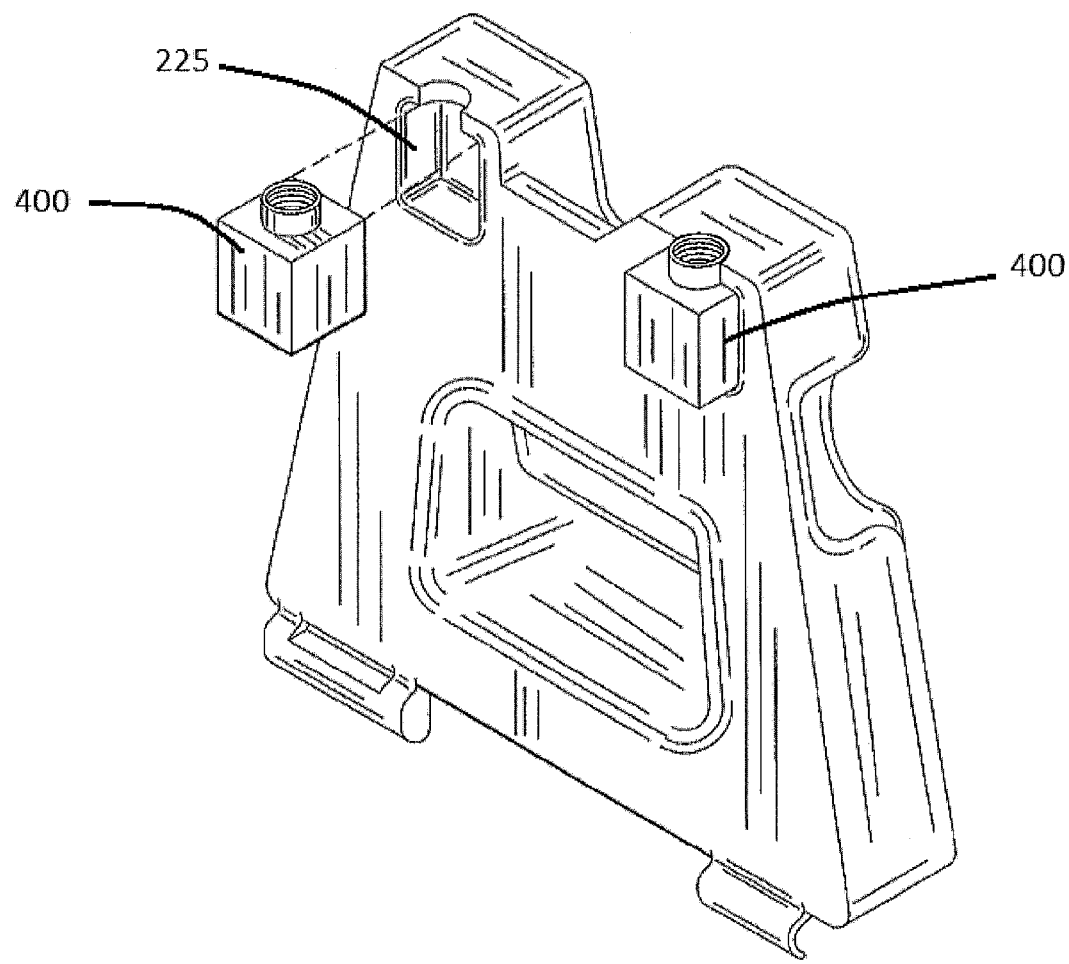
FIG. 5 is a view of the insert being inserted into the first member in accordance with example embodiments.

In example embodiments the flanges 210 may include a pair of cavities 225 as shown in FIG. 3B. In example embodiments, the pair of cavities 225 may be configured to accommodate a pair of inserts 400 as shown in FIGS. 4 and 5. In example embodiments, the connector 100 may further include a side member 230 having a notch 235 as shown in FIG. 3A. In example embodiments, the side member 230 may correspond to the side member 130 of the completed connector 100.

In example embodiments, the first member 200 may further include connecting members configured to connect the first member 200 to the second member 300. For example, in example embodiments, the connecting members may include a hook 242 and a catch 244. The catch 244 may include a rod like member about which another hook may attach.

FIG. 4 illustrates an example of an insert 400 in accordance with example embodiments. As shown in FIG. 4, the insert 400 may include a body 420 and a threaded neck 430. In example embodiments, the body 420 may be, but is not required to be, a block shaped element having a square or rectangular cross section. Example embodiments, however, are not intended to be limited by this feature as a cross section of the body 420 may have another shape such as, but not limited to, a hexagonal or octagonal shape. In example embodiments, the body 420 may be configured to insert into the cavities 225 of the first member 200 as shown in FIG. 5. In example embodiments, the neck 430 may resemble an internally threaded cylinder. In some embodiments, the internally threads may extend into the body 420.

In example embodiments, the second member 300 may be substantially identical to the first member 200. For example, the second member 300 may include a pair of flanges that may make up half of the pair of flanges 110 illustrated in FIG. 2. Furthermore, the flanges of the second member 300 may have an in inwardly tapering post section adjacent to which may be a top recess. In example embodiments, the inwardly tapering post sections of the second member 300 may form the other half of the inwardly tapering post sections 120 illustrated in FIG. 2.

Figure 6A:
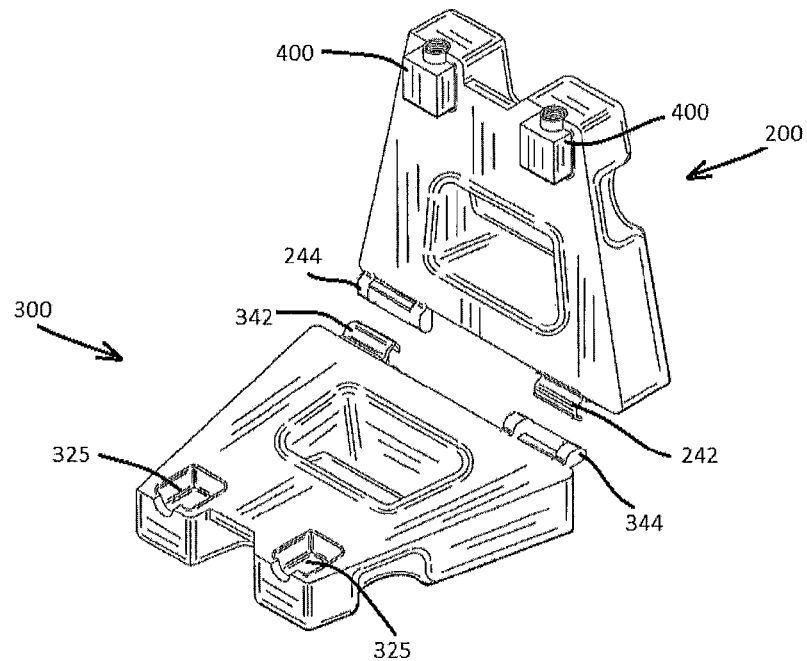
FIGS. 6A and 6B illustrate the first member and a second member of the connector being coupled together in accordance with example embodiments.
Figure 6B:
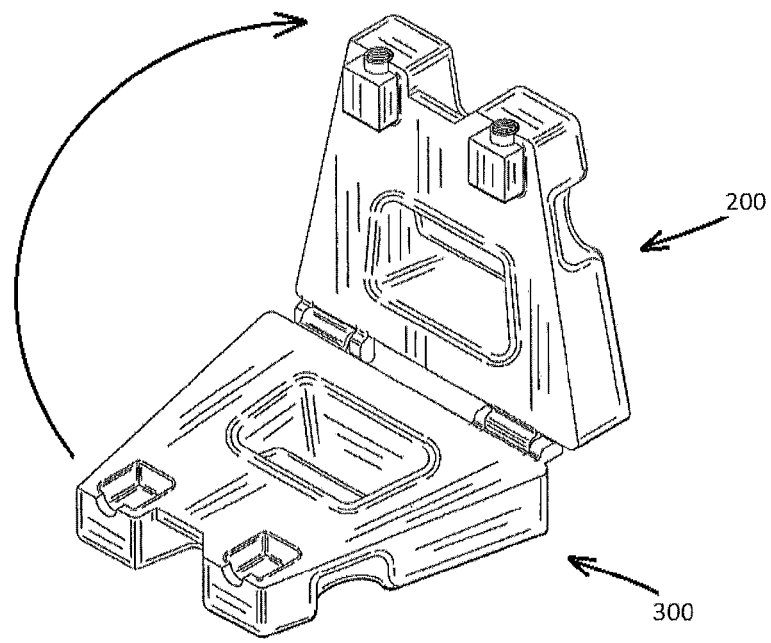

Like the first member 200, the second member 300 may include a pair of cavities 325 as shown in FIGS. 6A and 6B. The pair of cavities 325 may be configured to accommodate the inserts 400 illustrated in FIG. 5. Also, the second member 300 may further include connecting members configured to connect the second member 300 to the first member 200. For example, in example embodiments, the connecting members may include a hook 342 and a catch 344.

Referring to FIGS. 6A and 6B the first and second members 200 and 300 may be connected to one another via the hooks 242 and 342 and the catches 244 and 344. In this particular nonlimiting example embodiment, once the first and second members 200 and 300 are connected via their respective hooks 242 and 342 and catches 244 and 344, the first and second members 200 and 300 may be rotated towards one another until they meet trapping the inserts 400 in the cavities 225 and 325 of the first and second members 200 and 300.

In example embodiments, the first and second members 200 and 300 may be held together by a variety of means such as, but not limited to, gluing, welding, and/or using conventional screws, nuts, and/or bolts. In example embodiments, other means such as, but not limited to, straps may also be used to keep the first and second members 200 and 300 together. In the event the first and second members 200 are made of a plastic or plastic like material, heat may be applied to the first and second members 200 and 300 to fuse the first and second members 200 and 300 together.

In example embodiments the first and second members 200 and 300 may be made from a water resistant material, for example, durable polyethylene. The material may be fed into a mold to form the first and second members 200 and 300. Because the first and second members 200 and 300 may be identical they may be produced from the same mold. On the other hand, multiple relatively identical molds may be used to produce a plurality of the first and second members 200 and 300. This allows for a relatively easy method of mass producing the first and second members 200 and 300. However, as indicated above, the first and second members 200 and 300 are not required to be identical, thus, in the event the connector 100 is comprised of a first member 200 which is not substantially identical to the second member 300, separate molds may be required.

Figure 7:
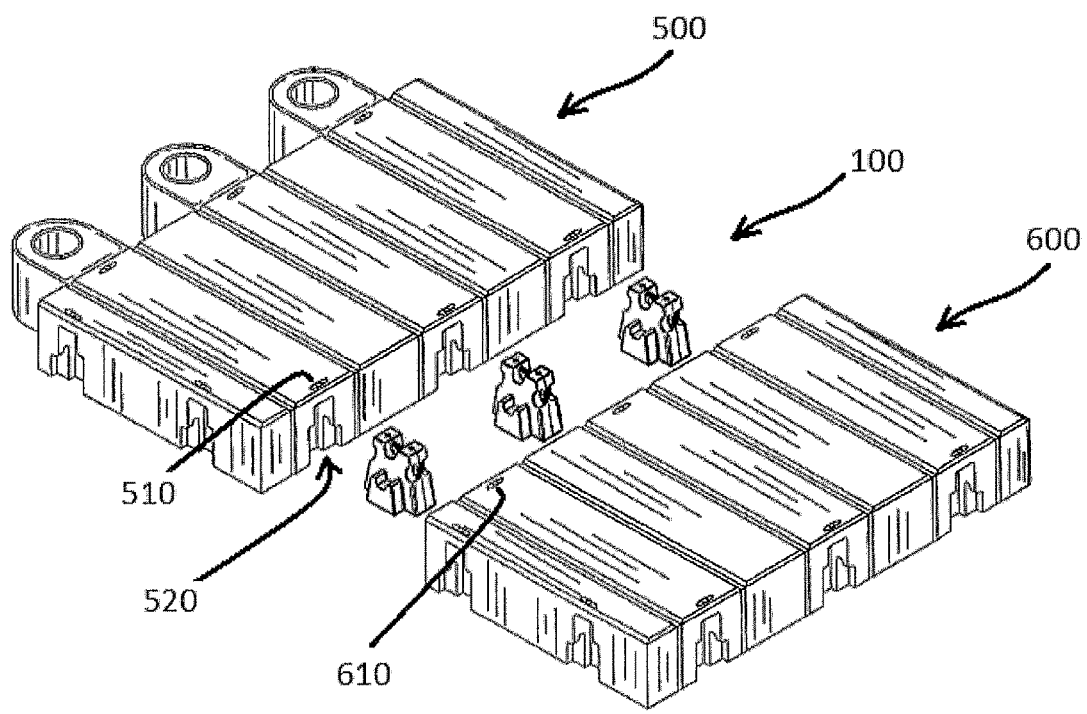
FIG. 7 is a view of a system in accordance with example embodiments.

FIG. 7 illustrates an example of a system 1000 in accordance with example embodiments. In example embodiments, the system 1000 may include a first structure 500 and a second structure 600 which may be connected together by a plurality of connectors 100. In example embodiments, the first and second structures 500 and 600 may be, but are not required to be, associated with a floating dock.

In example embodiments, each of the first and second structures 500 and 600 may contain a plurality of sockets in which the connectors 100 may interlock with. For example, as shown in FIG. 7, the first structure 500 may a plurality of sockets 520, one of which is labeled. Similarly, the second structure 600 may also include a plurality of sockets that may resemble the socket 520. The connectors 100 may connect the first structure 500 to the second structure 600 by interlocking the connectors 100 with the sockets of the first and second structures 500 and 600.

Figure 8:
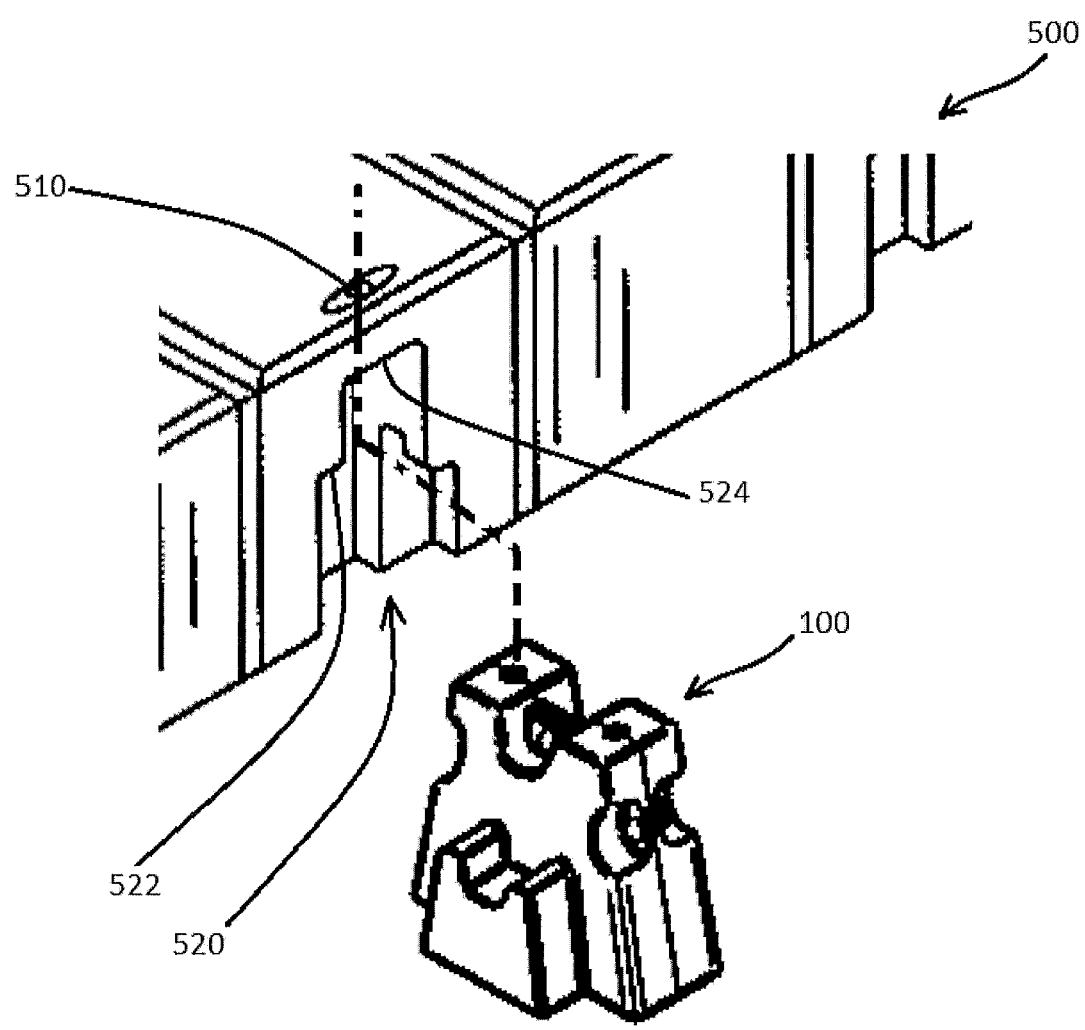
FIG. 8 is a view of a connector being connected to a structure in accordance with example embodiments.

FIG. 8 illustrates an example of how the connector 100 may interlock with a socket 520 of the connector 100. In this particular nonlimiting example, the socket 520 may include a first ledge 522 and a second ledge 524. When the connector 100 is inserted into the socket 520, the first ledge 522 may be positioned in the notch 135 of the side member 130 and the second ledge 524 may be positioned in the top recess 125. The connector 100 may be fixed to the first structure 500 by passing a threaded member, for example, a screw through a hole 510 in the first structure 500 and into an aperture 140 of the of the connector 100 to interface with the threads of the neck 430 of the insert 400. In this way, the connector 100 may be fixed to the first structure 500. The connector 100 may also be fixed to the second structure 600 in a similar manner.

Figure 9:
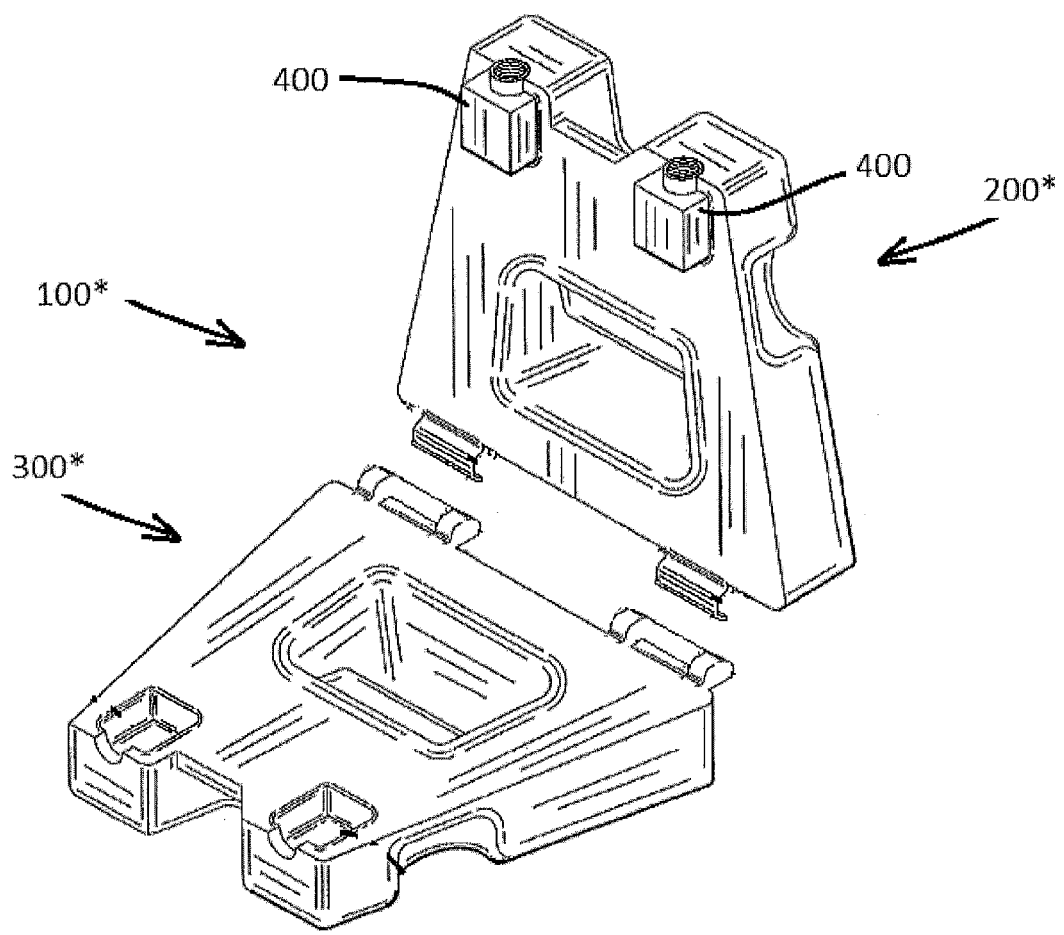
FIG. 9 is a view of a connector in accordance with example embodiments.
Figure 10:
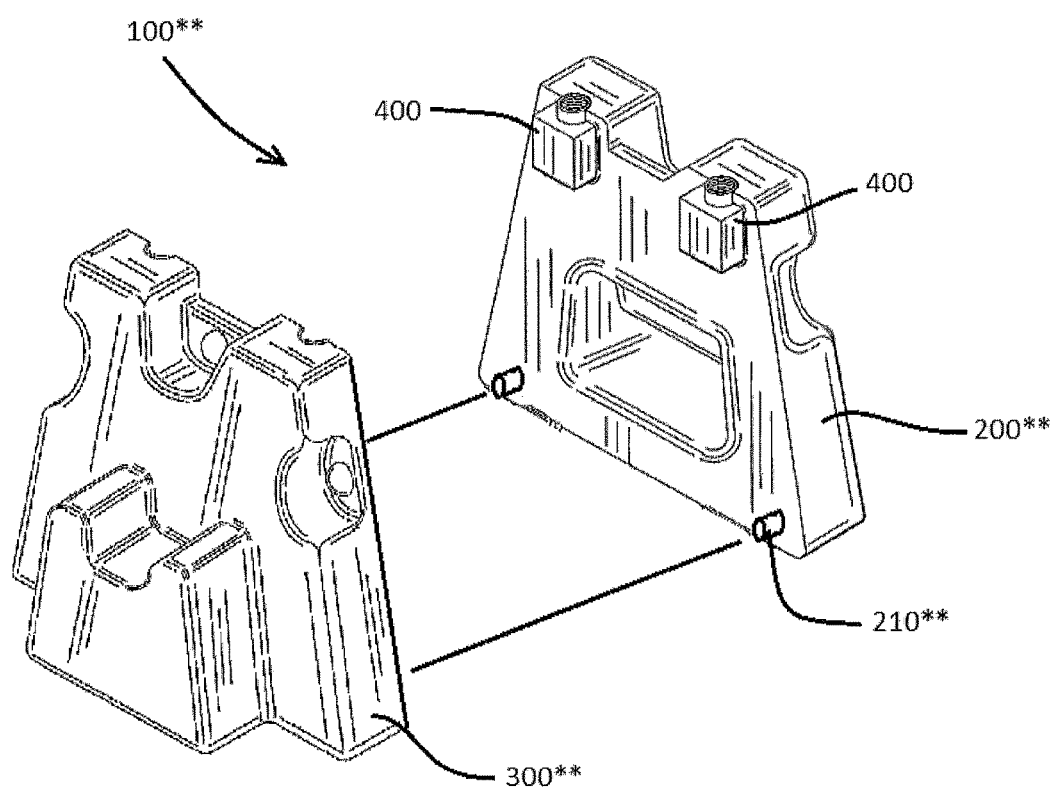
FIG. 10 is a view of a connector in accordance with example embodiments.

FIGS. 9 and 10 are exploded views of other connectors in accordance with example embodiments. In FIG. 9, the connector 100\* is similar to the previously described connector 100 except that the first member 200\* of connector 100\* includes two hooks and the second member 300\* of connector 100\* includes two catches. In FIG. 10, the connector **100\*\* does not include hooks and catches but instead uses pins 210\*\* that may be present in the second member 200\* and corresponding holes (not shown) that may be in the third member 300\* to connect the first and second members 200\*\* and 300\*\* together. In this latter embodiment, the first and second members 200\*\* and 300\*\* may be connected together by pressing the pins 210\*\* of the first member 200\*\* into the holes of the second member 300\*\*. In the alternative, the first member 200\*\* may include a single pin and a receiving hole and the second member 300\*\* may include a corresponding pin and a corresponding receiving hole. In this latter embodiment, the pin of the second member 200\* may be inserted in to the receiving hole of the second member 300\* and the pin of the second member 300\*\* may be inserted into the receiving hole of the first member 200\*\*. This latter embodiment allows the first and second members 200\*\* and 300\*\*** to be substantially identical.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

We claim:

1. A connector comprising:
   a first member having a first hook, a first catch, and a first cavity;
   a second member having a second hook, a second catch and a second cavity, the first hook engaged with the second catch and the second hook engaged with the first catch to rotatably connect the first member to the second member; and
   an insert captured in the first and second cavities, wherein the first member and the second member are generally identical and the insert includes a body and a threaded neck.

2. The connector of claim 1, wherein a top of the neck is substantially flush with a first surface of the first member and a second surface of the second member.

3. The connector of claim 1, wherein each of the first and second members include a recess.

4. The connector of claim 1, wherein the first member includes a first side member and the second member includes a second side member.

5. The connector of claim 4, wherein each of the first and second side members include a recess.

6. The connector of claim 1, wherein the threaded neck has threads internal to the neck.

7. The connector of claim 1, wherein the body is block shaped.

8. The connector of claim 1, wherein each of the first and second members include a side member with a notch on a top surface thereof and substantially flat post sections.

9. The connector of claim 1, wherein the first and second hooks and the first and second catches are arranged at a bottom of the connector and the insert is arranged at a top of the connector.

10. A floating dock system comprised of:
- a floating dock having a receiving socket with an aperture, a first ledge, and a second ledge;
- a connector comprising a first member having a first hook, a first catch, and a first cavity, a second member having a second hook, a second catch and a second cavity, the first hook engaged with the second catch and the second hook engaged with the first catch so that the first and second members are rotatably connected, and an insert captured in the first and second cavities, wherein the first member and the second member are generally identical and the insert has a threaded neck aligned with the aperture in the floating dock; and
- a fastening member extending through the aperture of the floating dock and into the threaded neck of the insert fastening the connector to the floating dock, wherein the first ledge is in a top recess of the connector and the second ledge is in a notch of the connector.

11. The floating dock system of claim 10, wherein the connector is configured to connect the floating dock to another floating dock.

* * * * *